United States Patent [19]

Komiyama et al.

[11] 4,221,190
[45] Sep. 9, 1980

[54] COMBUSTION CHAMBER FOR AN INTERNAL COMBUSTION ENGINE OF DIRECT INJECTION TYPE

[75] Inventors: Kunihiko Komiyama; Seikichi Kanai; Masaru Okada, all of Oyama, Japan

[73] Assignee: Kabushiki Kaisha Komatsu Seisakusho, Tokyo, Japan

[21] Appl. No.: 19,714

[22] Filed: Mar. 12, 1979

[30] Foreign Application Priority Data

Mar. 10, 1978 [JP] Japan .............................. 53-29658[U]
Mar. 10, 1978 [JP] Japan .............................. 53-29659[U]
Mar. 10, 1978 [JP] Japan .............................. 53-29660[U]

[51] Int. Cl.³ ................................................ F02B 3/00
[52] U.S. Cl. ....................................... 123/263; 123/276; 123/285
[58] Field of Search .................. 123/30 C, 32 R, 32 A

[56] References Cited
U.S. PATENT DOCUMENTS

| 3,112,738 | 12/1963 | Morris | 123/32 R |
| 4,108,116 | 8/1978 | Ohta | 123/32 R X |
| 4,164,913 | 8/1979 | Komiyama et al. | 123/30 C |
| 4,177,769 | 12/1979 | Okada et al. | 123/32 A |

*Primary Examiner*—Charles E. Phillips
*Attorney, Agent, or Firm*—Armstrong, Nikaido, Marmelstein & Kubovcik

[57] ABSTRACT

A combustion chamber for an internal combustion engine of the direct injection type defined by a cylinder head, a cylinder liner and a piston head, the piston head having formed therein a cavity in which air swirl can be produced by a known means.

A fuel injection valve having a plurality of fuel injection nozzles is disposed above the cavity for injecting jets of fuel radially against the cavity wall.

The cavity comprises an equilateral polygonal cavity formed in the upper part of the piston head and a toroidal cavity formed continuously to the polygonal cavity in the lower part of the piston head. The equilateral polygonal cavity has rounded corners formed therein, the ratio of the radius of the rounded corners to that of a inscribed circle of the equilateral polygonal cavity being from about 0.05 to about 0.8.

4 Claims, 14 Drawing Figures

COMBUSTION CHAMBER FOR AN INTERNAL COMBUSTION ENGINE OF DIRECT INJECTION TYPE

BACKGROUND OF THE INVENTION

This invention relates to a combustion chamber for internal combustion engines of the direct injection type, and more particularly to a combustion chamber which can reduce the level of noise (hereinafter referred to as the noise generated by combustion) and can also reduce the amount of nitrogen oxide (hereinafter referred to as NOx).

It is well known in the field of the art that in internal combustion engines if the timing of injection of fuel into the combustion chamber is delayed to some extent so as to reduce the explosion pressure and the rate of increase thereof the level of the noise generated by fuel combustion can be reduced and at the same time the combustion gas temperature can be lowered thereby reducing the amount of NOx.

However, there encounters a difficulty that in general when the timing of fuel injection is delayed the thermal efficiency of the Diesel cycle will be lowered so as to increase the fuel consumption rate, and so imperfect combustion is caused thereby producing black exhaust gas or smoke.

Stated in brief, the fuel comsumption rate is a function of $dM/dt.S.Tm.Td.d\theta/dt$, and in a similar manner the color of exhaust gas, NOx, and the noise generated by combustion are a function of $dM/dt.S.Tm.Td.d\theta/dt$, respectively.

A delay in injection timing serves to reduce an ignition lag $Td$, and therefore as a mean cycle gas temperature $Tm$ and a heat generation coefficient $d\theta/dt$ are reduced the velocity of mixing fuel and air $dM/dt$ and the time and space distribution "S" of mixing ratio will be reduced.

Accordingly, if the timing of fuel injection is delayed the level of noise generated by fuel combustion and the amount of NOx can be reduced; however, the fuel consumption rate will be increased thereby generating black exhaust gas or smoke based on the above-mentioned relationship.

In order to eliminate such difficulty it is only necessary to increase the air and fuel mixing speed $dM/dt$ at the time of delaying the fuel injection timing or increase the combustion speed after the fuel ignition. Stated more specifically, the emission of black exhaust gas and increase in fuel consumption rate are due to the fact that the combustion process is maintained even after the piston has reached its top dead centre, and so in order to eliminate the above-mentioned disadvantage, it is necessary to increase the combustion speed thereby shortening the combustion period.

In order to increase the combustion speed, it is required to increase the air flow (in particular, the air flow after the fuel ignition) within the combustion chamber. The term "air flow" employed herein is meant by a large swirl motion generated in the combustion chamber and a resultant turbulence of a small scale.

To produce the above-mentioned air flow, there is conventionally provided a quadrilateral combustion chamber having a quadrilateral cavity formed in the upper part of top of a piston.

The combustion chamber of this form enables air turbulences of a small scale to be produced by a large air swirl motion in the corner square parts thereof so that a strong air flow can be produced therein.

However, the combustion chamber of such shape is disadvantageous in that the intensity of the turbulence of a small scale generated in the corner square parts and that of the large swirl are contrary to each other. In brief, if radius "R" of the corner square parts is comparatively smaller than radius "Ro" of the inscribed circle of the quadrilateral cavity (if the ratio R/Ro is reduced) the intensity of air turbulences of a small scale generated in the corner square parts can be increased; therefore the intensity of the large air swirl motion will be reduced. If the ratio R/Ro is increased, the intensity of the large air swirl can be increased, whilst the air turbulence of a small scale generated in the corner square parts will be reduced.

In any case, the combustion chamber of the conventional shape cannot afford increased turbulences of a small scale and the large air swirl motion at the same time, and further the turbulences can be produced only in the corner square parts so that a sufficiently large air flow cannot be produced therein.

SUMMARY OF THE INVENTION

It is therefore an object of the present invention to provide a combustion chamber having an equilateral polygonal cavity and a toroidal cavity formed continuously to said equilateral polygonal cavity in the piston head which is capable of producing a theoretical combustion process.

Another object of the present invention is to provide a combustion chamber which can produce improved air flow therein by the action of two air swirls produced in the equilateral polygonal cavity and in the toroidal cavity, respectively.

A further object of the present invention is to provide a combustion chamber whereby the angle of impingement of the fuel against the cavity wall and the wetted area thereon can be adjusted so as to attain improved mixing of the fuel and air.

In accordance with an aspect of the present invention, there is provided a combustion chamber for use in an internal combustion engine of direct injection type which is defined by a cylinder head, a cylinder liner and a piston head, the piston head having formed therein a cavity in which the air swirl can be produced by known means.

Said cavity comprises an equilateral polygonal cavity formed in the upper part of said piston head and a toroidal cavity formed continuously to said polygonal cavity in the lower part of said piston head. A fuel injection valve having a plurality of injection nozzles is disposed above said cavity for injecting jets of fuel radially against the cavity wall.

A relatively low speed swirl is produced in the polygonal cavity even in the high engine speed region, while maintaining an adequate swirl intensity in the low-speed region. A relatively high speed swirl is produced in the toroidal cavity, on the other hand, in the high engine speed region thereby producing an air turbulence between said two swirls so as to produce improved air flow in the combustion chamber.

The equilateral polygonal cavity has rounded corners formed therein, the ratio of the radius of the rounded corners to that of an inscribed circle of said equilateral polygonal cavity being in the range of from about 0.05 to about 0.8 to attain an excellent fuel and air mixture.

Fuel injection angles in vertical and horizontal directions are also important for the fuel and air mixture and therefore the angle ranges are analized accordingly.

These and other objects, features and advantages of the present invention will be readily apparent from the following description taken in conjunction with the accompanying drawings.

DETAILED DESCRIPTION OF THE PREFERRED EMBODIMENTS

The present invention will now be described in detail below with reference to the accompanying drawings.

Figure 1:
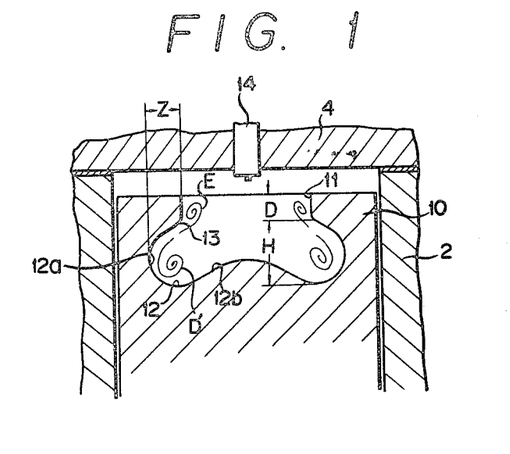
FIG. 1 is a sectional view of a combustion chamber according to the present invention.

Referring to FIG. 1, reference numeral 2 denotes a cylinder liner, and 4 a cylinder head having a fuel injection valve 14 mounted in the approximately central part thereof.

Reference numeral 10 represents a piston having an upper quadrilateral cavity 11 and a lower toroidal or roundshaped cavity 12 cast or formed integrally or continuously in the vertical direction.

Figure 2:
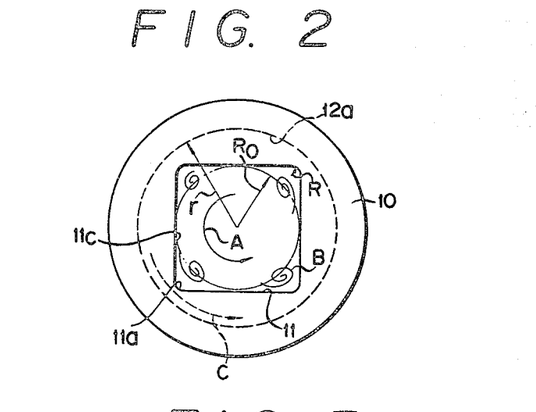
FIG. 2 is a plan view of the piston head of FIG. 1.

Round corners 11a of the upper quadrilateral cavity 11 are located inwards relative to inner peripheral walls 12a of the lower toroidal cavity 12. Inner peripheral wall 12a is smoothly curved in the vertical direction, and a part 13 connecting the inner peripheral wall 12a of the toroidal cavity 12 and the inner peripheral wall 11b of the upper quadrilateral cavity 11 is smoothly curved. The lower rounded cavity 12 has a bottom wall 12b having a convex angular or mountainous cross-section.

Further, in the embodiment of the present invention the upper quadrilateral cavity 11 having a depth "D" and the lower toroidal cavity 12 having a depth "H" are formed so as to have a ratio therebetween or D/H of 0.75.

For this purpose, the inner peripheral wall 11b of the upper quadrilateral cavity 11 overhangs relative to the inner peripheral wall 12a of the lower toroidal cavity 12 by a dimension of "Z".

Further, jets of fuel can be directed to or slightly below the connection part 13.

Thus, an upper large swirl "A" is produced by a known means within the upper quadrilateral cavity 11, air turbulences "B" of a small scale are produced in the rounded corner regions 11a, and a lower large swirl "C" is produced within the lower toroidal cavity 12.

At the same time, air turbulences "D" and "E" of a small scale can be produced in the curved inner peripheral wall 12a and in the connection part 13.

Further, during the suction stroke the upper large swirl "A" and the lower large swirl "C" are produced by a known means provided in suction parts. Due to a strong friction occurring between the upper large swirl "A" and side parts 11c of the upper quadrilateral cavity 11, the swirl motion of the upper large air swirl "A" is reduced, so that the intensity of the lower large swirl "C" will become greater than that of the upper large swirl "A".

Stated in brief, because the swirl speed of the lower large swirl "C" is greater than that of the upper large swirl "A", a turbulence due to shear flow is produced between the upper large swirl "A" and the lower large swirl "C".

The intensity of the turbulence due to shear flow varies depending on D/H or the ratio of the depth "D" of the upper quadrilateral cavity 11 and the depth "H" of the lower toroidal cavity 12.

Figure 3:
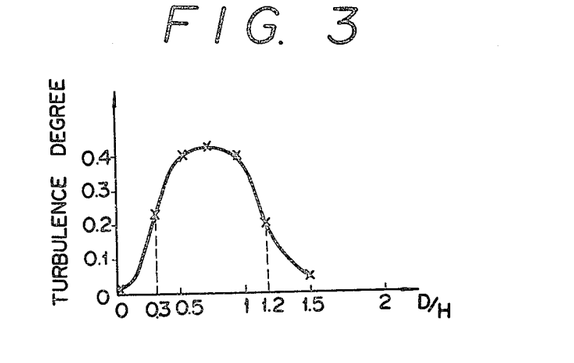
FIG. 3 is a graph showing a relationship between the ratio of the depth of the polygonal cavity of that of the toroidal cavity and the degree of turbulence of the fluid flow in both cavities.

FIG. 3 shows the degree of turbulences obtained by varying the ratio D/H where the ratio of the inside radius r of the lower toroidal cavity 12 to the radius Ro of the inscribed circle of the upper quadrilateral cavity 11 or r/Ro is set at 1.2. It can be seen from the graph that a satisfactory strong air turbulence can be produced if the ratio D/H is set in the range of 0.3 to 1.2. More preferably, D/H is in the range of 0.5 to 1.0.

From the graph shown in FIG. 3, it is to be understood that the degree of turbulence is obtained by dividing the vertical Reynolds shearing stress by the square of mean swirl flow.

Further, since the amount of overhang "Z" varies in the circumferential direction, the intensities of turbulences D' and E of a small scale vary circumferentially so as to produce shear flows in these regions so that the turbulences "D" and "E" will become more complex.

Thus, various kinds of swirls and turbulences can be produced in the combustion chamber so as to increase air flow in it, and therefore the fuel combustion speed can be increased, and the fuel consumption rate can be reduced thereby eliminating generation of black exhaust gas.

A concrete combustion process will now be described below.

Figure 4:
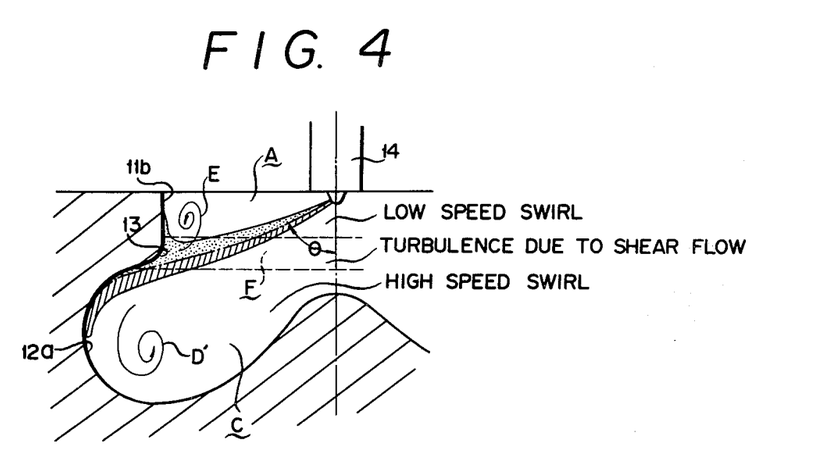
FIG. 4 is an explanatory view showing a behaviour of mixing the fuel injected by the nozzle with air.

As shown in FIG. 4, jets of fuel injected by a fuel injection valve 14 are dispersed or separated at the connection part 13 serving as a boundary into two directions of flows i.e., one to be directed to the upper quadrilateral cavity 11 and the other to be directed to the lower toroidal cavity 12. The jets of fuel are injected obliquely from the above into the combustion chamber so that they pass at first through the upper large swirl region "A" (hereinafter referred to as low speed swirl region) having a low swirl speed, and then pass through turbulence region "F" and thereafter reach the lower large swirl region "C" (hereinafter referred to as high speed swirl region) having a high swirl speed.

Since the jets of fuel are directed to the connection part 13 or slightly below the part 13, they are allowed to pass through the intermediate turbulence region "F" for the longest time. It will be obvious that the most excellent mixing of fuel and air takes place when jets of fuel are passing through the air turbulence region "F".

Figure 5:
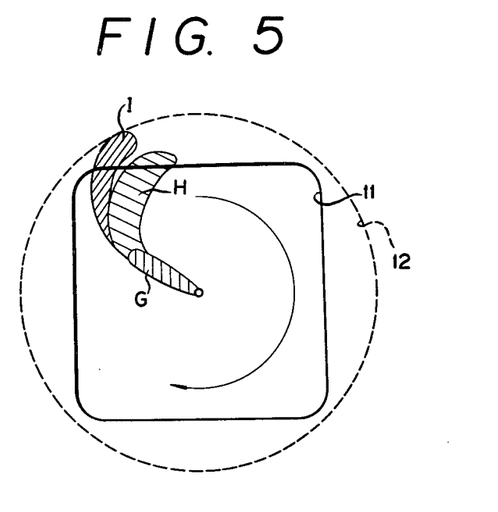
FIG. 5 is also an explanatory plan view showing a behaviour of mixing the fuel injected by the nozzle with air.
Figure 6:
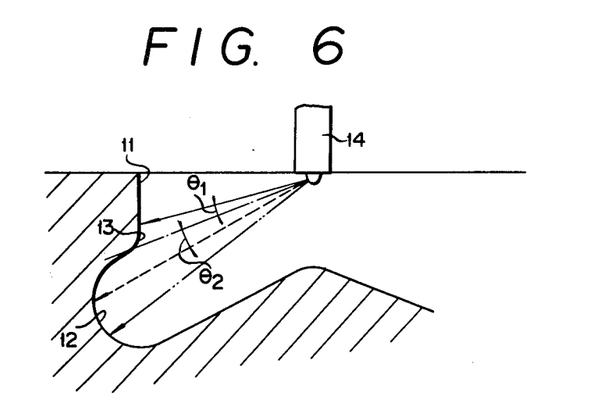
FIG. 6 is an explanatory view showing fuel injection angle relative to the nozzle.

Referring to FIG. 5 showing the behaviour of mixing the fuel injected by the nozzle with air, jets of fuel pass through the low speed swirl region (Region "G") without being forced by the swirl, and then enter the region "H" where the jets of fuel are satisfactorily mixed with air by the turbulence while they are being forced by the swirl to some degree. However, comparatively coarse fuel particles cannot be sufficiently mixed with air even in the air turbulence region. Thereafter, coarse fuel particles will meet the high speed air flow in the high speed swirl region so that decomposition and vaporization of the fuel particles are accelerated thereby satisfactorily mixing the fuel particles with air (Region "I").

Further, it is needless to say that the air turbulences B, D' and E of a small scale contribute to the above-mentioned formation of mixed vapour. The rate of fuel jets passing through the air turbulence region and their passing condition can be controlled by changing injection angle $\theta$ shown in FIG. 4.

Figure 7:
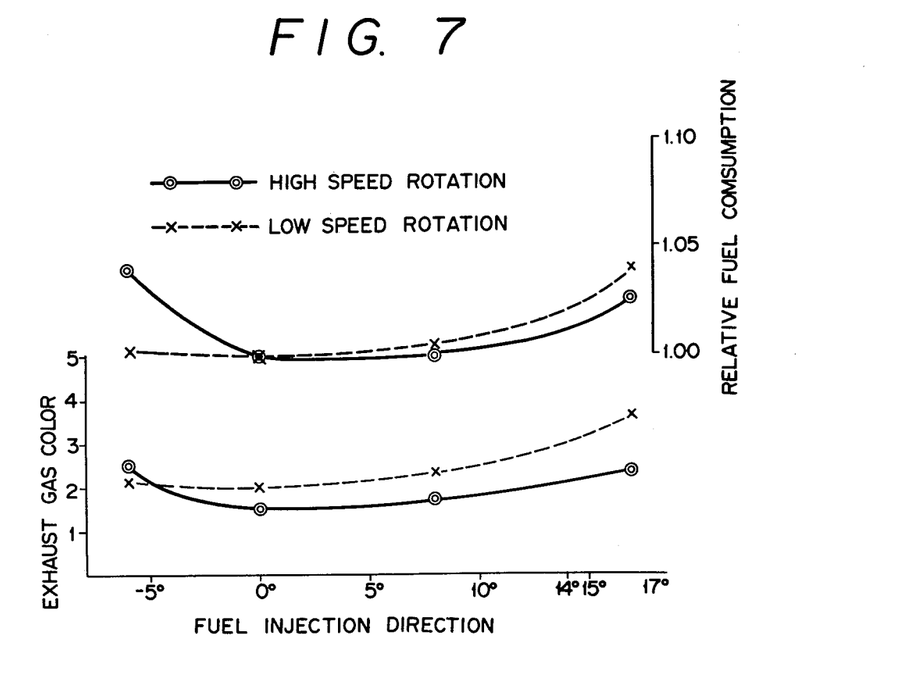
FIG. 7 is a graph showing comparison tests of exhaust gas color as well as relative fuel consumption rate by changing the direction of fuel injection.

Stating in brief, where the upper injection angle $\theta_1$ and the lower injection angle $\theta_2$ relative to the connection part 13 were varied to measure the color of exhaust gas and the relative fuel consumption rate, the result as shown in FIG. 7 was obtained.

This graph shows that satisfactory result can be obtained when the upper injection angle $\theta_1$ is about 5 degrees and the lower injection angle $\theta_2$ is up to about 14 degrees. A more desirable fuel injection angle ranges from 0 degrees to about 4 degrees.

As mentioned hereinabove, air swirls and turbulences due to shear flow exist in the whole combustion chamber so as to produce sufficiently large air flow so that jets of fuel injected therein from the beginning of injection to the completion of injection can be sufficiently mixed with air thereby increasing the combustion speed or rate.

Further, in order to increase further the fuel combustion speed or rate after the ignition, it is necessary to burn the fuel remaining in every part of the combustion chamber after completion of the injection.

For this purpose, the above-mentioned local existence of turbulences in the combustion chamber is effective, but the existence of swirls is more important to achieve the overall excellent mixing effect.

In the above-mentioned embodiment of the present invention, because of high swirl speed of the lower large swirl "C" within the lower toroidal cavity 12, upon completion of fuel injection and commencement of down stroke of the piston, the lower large swirl "C" existing in the lower part of the combustion chamber will move upwards towards the upper quadrilateral cavity 11 so as to mix the fuel particles with air sufficiently thereby increasing further the fuel combustion speed or rate. At the same time air flow equivalent to so-called squish takes place so as to produce air turbulences of a small scale in the lower part of the upper quadrilateral cavity 11.

In brief, the lower toroidal cavity 12 serves not only to produce a swirl speed difference between the upper large swirl "A" and the lower large swirl "C", but also as a high speed swirl storage chamber for forming swirls again in the whole combustion chamber during the down stroke of the piston.

In order to attain a good mixing of the fuel with the air, it is needless to say that the fuel be injected into a combustion chamber having an active air flow. Therefore various experiments have been carried out to determine an optimum range of the ratio of the radius of the rounded corners 11a to that of an inscribed circle of the upper quadrilateral cavity 11 or R/Ro so that active enough air flows can be produced in the combustion chamber.

It is to be noted that the upper cavity 11 must retain the properties associated with the quadrilateral one throughout the range of the ratio R/Ro.

Figure 8:
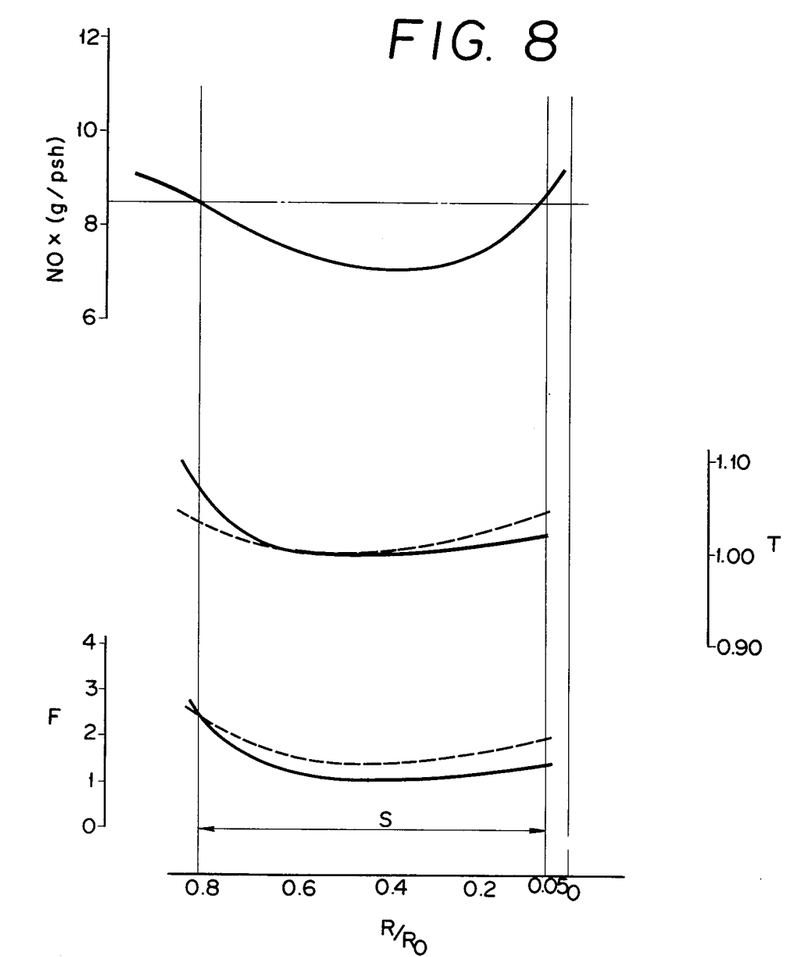
FIG. 8 is a graph showing a relationship between a ratio of the radius of each rounded corner of the equilateral polygonal cavity to that of an inscribed circle thereof or R/Ro and the exhaust gas color, the relative fuel consumption rate and NOx in which the solid lines represent high speed rotation of the air swirl and the dotted lines denote low speed rotation thereof.

Relationships of the ratio R/Ro with the exhaust gas color, the relative fuel consumption rate and NOx were plotted, respectively, and shown in FIG. 8. In this particular embodiment, D/H is set at 0.66. Solid lines show high speed air swirl and dotted lines show low speed air swirl.

By observing the drawing, it is to be noted that an adequate range of R/Ro is from about 0.05 to 0.8 and more preferably from about 0.3 to 0.6.

When R/Ro is within the above range, the exhaust gas color, the relative fuel consumption rate and NOx can be improved significantly.

As described hereinabove, the optimum injection angle in vertical direction is in a range of from −5° to 14° and more preferably from 0° to 4°.

In order to produce an excellent fuel and air mixture, not only vertical but also horizontal injection angles play a key role and be determined accordingly.

Referring back to FIG. 5, the injected fuel is forced to bend in the direction of air swirl when passing therethrough.

Figure 9:
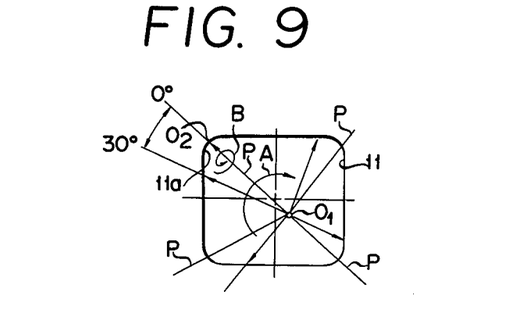
FIG. 9 is a plan view of the upper equilateral polygonal cavity explaining a pertinent fuel injection angle in horizontal direction.

On the other hand, since the upper cavity is quadrilateral in shape, air turbulences B of a small scale is formed in the corner portions 11a, and therefore air density is increased thereat. Accordingly, the jets of fuel injected from the injection nozzles are controlled to hit corner portions 11a to produce an excellent fuel and air mixture. Therefore the number of injection nozzles should be equal to the number of corners of the quadrilateral cavity and the fuel be injected on the upstream side of the air swirl with respect to a reference line P connecting the center of the injection valve 14 with that of each corner portion 11a of the quadrilateral cavity 11 as shown in FIG. 9.

Figure 10:
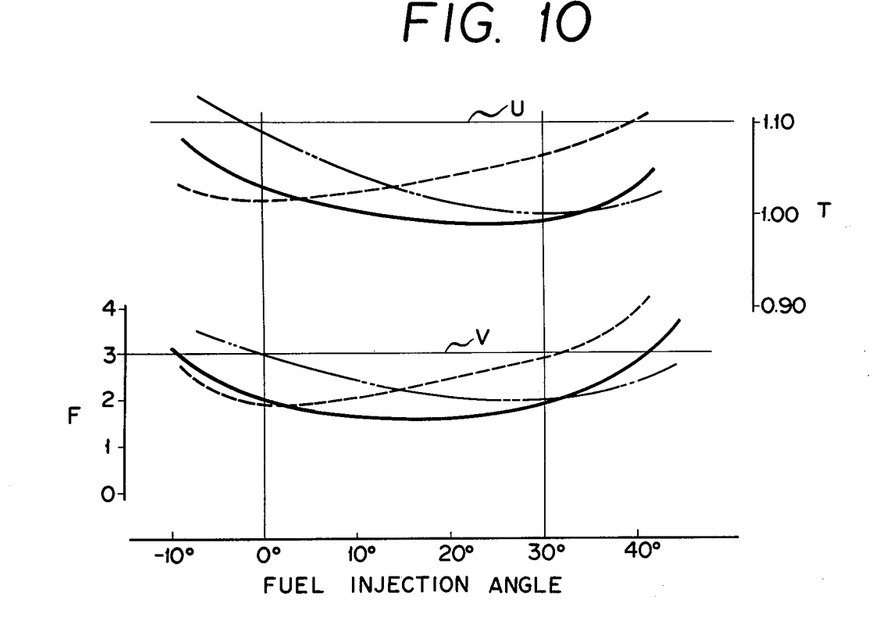
FIG. 10 is a graph showing the engine performance by varying the fuel injection angle in horizontal direction in terms of the exhaust gas color, and the relative fuel consumption rate in which the dotted lines show a none-swirl type engine, the solid lines represent an engine having a medium intensity swirl and the dash and dotted lines or imaginary lines denote a strong swirl type engine.

An experiment has been carried out to determine an optimum range of horizontal injection angle in terms of the exhaust gas color and the relative fuel consumption rate, and the results are plotted as shown in FIG. 10.

Dotted lines show a none-swirl type engine, solid lines represent an engine having a medium intensity swirl and dash and dotted lines or imaginary lines denote a strong swirl type engine. The experiment was conducted under following conditions.

$D/H = 0.66$, $r/Ro = 1.2$, $R/Ro = 0.4$

Lines U and V represent target values to be attained in the experiment.

The lower the value, the better the result is.

By observing the FIG. 10, it is to be noted that the best results are obtained when the injection angle is zero in the case of none-swirl type engine while for those engines having swirl motions, the stronger the swirl becomes, the greater the angle is in order to attain best performances of the engines but there clearly exists a maximum injection angle which is set about 30°.

Accordingly, a preferable fuel injection angle in horizontal direction is in the range of about 0° to 30° on the upstream side of the air swirl when measured from the reference line connecting the center of the injection valve 14 and that of each corner portion 11a of the quadrilateral cavity 11.

Figure 11:
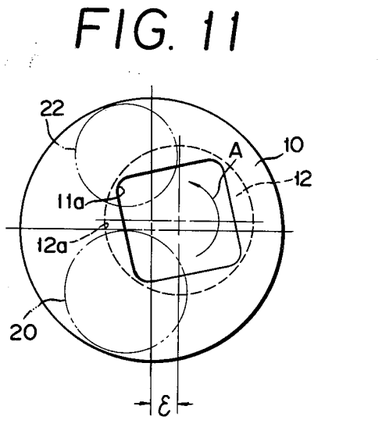
FIG. 11 is similar to FIG. 2 but showing another embodiment of the present invention.
Figure 12:
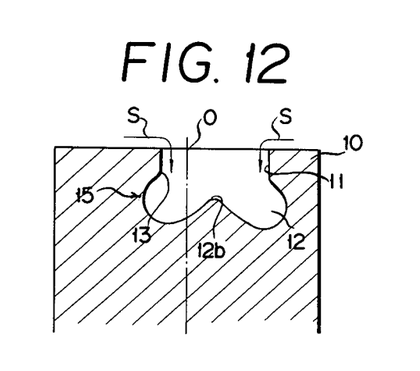
FIG. 12 is a longitudinal cross-sectional view of FIG. 11.

FIGS. 11 and 12 show another embodiment of the present invention wherein the center of the cavity is offset from the center of the piston. In this embodiment, the upper quadrilateral cavity 11 is coaxially disposed with the lower toroidal cavity 12. In high power small engines it is common to use relatively big suction and exhaust valves in order to improve suction and exhaust efficiencies and therefore it is hardly to provide such a high power small engine having cavities coaxially oriented with the piston.

Reference numeral 20 denotes a suction valve and 22 an exhaust valve.

Sucked air from the suction valve 20 is supplied into the quadrilateral cavity 11 to form the upper large swirl A and also into the toroidal cavity 12 to form the lower large swirl C.

As is the case of the first mentioned embodiment, air turbulence F is occurred between the swirls A and C due to difference in speed of the swirl motions.

The speed of squish formed by the reciprocal movement of the piston varies depending upon the position of the cavity offset from the center of the piston.

That is, the squish speed is faster at the offset side and slower at the opposite side. Therefore, irregular air turbulences are produced in the combustion chamber, which provides an excellent air and fuel mixture.

Figure 13:
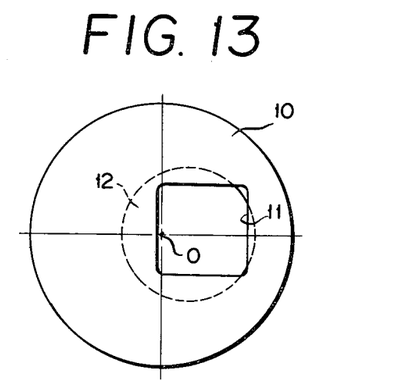
FIG. 13 is similar to FIG. 2 but showing still another embodiment of the present invention.
Figure 14:
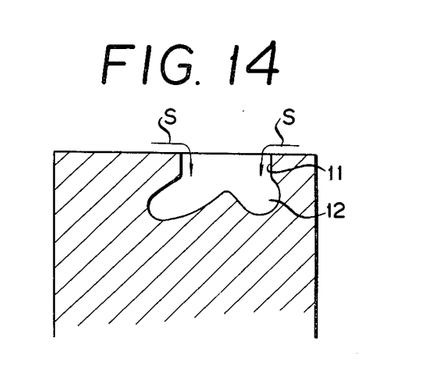
FIG. 14 is a longitudinal cross-sectional view of FIG. 13.

FIGS. 13 and 14 show still another embodiment of the present invention wherein the upper quadrilateral cavity 11 and the lower toroidal cavity 12 are offset from each other and both cavities are offset from the center of the piston.

Due to a complicated arrangement of the cavities, more irregular air turbulences may be produced in the combustion chamber, which provides an excellent air and fuel mixture as is the case of the above mentioned embodiment.

It is to be understood that the foregoing description is merely illustrative of the preferred embodiments of the present invention and that the scope of the present invention is, not to be limited thereto, but is to be determined by the proper scope of the appended claims.

What we claim is:

1. In an internal combustion engine of the direct injection type including combustion chambers each defined by a cylinder head, a cylinder liner, and a piston head having a wall defining a cavity therein, means for producing air swirl in said cavity and fuel injection means each having a plurality of fuel injection nozzles, said nozzles being arranged to inject jets of fuel into said cavity radially against said cavity wall, the improvement wherein said cavity wall is constructed to define a generally equilateral polygonal cavity formed in the upper part thereof and a generally toroidal cavity formed in the lower part thereof, the ratio of the depth of said equilateral polygonal cavity to that of said toroidal cavity being about 0.3 to about 1.2, and wherein said equilateral polygonal cavity has rounded corners formed therein, the ratio of the radius of said rounded corners to that of an inscribed circle of said equilateral polygonal cavity being from about 0.05 to about 0.8.

2. A combustion chamber of an engine as defined in claim 1 wherein the number of fuel injection nozzles of said fuel injection means is equal to the number of corners of said equilateral polygonal cavity and wherein the fuel is injected on the upstream side of the air swirl with respect to a reference line connecting the center of said fuel injection means with that of each corner portion of said equilateral polygonal cavity, the injection angle in horizontal direction being in the range of from about 0° to about 30° when measured from the reference line.

3. A combustion chamber of the engine as defined in claim 1 wherein said equilateral polygonal cavity and said toroidal cavity are coaxially disposed with each other but are offset from the center of the piston head.

4. A combustion chamber of the engine as defined in claim 1 wherein said equilateral polygonal cavity and said toroidal cavity are offset from each other and said both cavities are offset from the center of the piston head.

* * * * *